United States Patent
Lvin et al.

(10) Patent No.: US 9,483,343 B2
(45) Date of Patent: Nov. 1, 2016

(54) SYSTEM AND METHOD OF VISUALIZING HISTORICAL EVENT CORRELATIONS IN A DATA CENTER

(71) Applicants: Vyacheslav Lvin, San Jose, CA (US); Venkatesh Sundararaj Ellappa, Sunnyvale, CA (US)

(72) Inventors: Vyacheslav Lvin, San Jose, CA (US); Venkatesh Sundararaj Ellappa, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 140 days.

(21) Appl. No.: 14/573,729

(22) Filed: Dec. 17, 2014

(65) Prior Publication Data

US 2016/0179598 A1 Jun. 23, 2016

(51) Int. Cl.
*G06F 11/00* (2006.01)
*G06F 11/07* (2006.01)
*H04L 12/24* (2006.01)

(52) U.S. Cl.
CPC ......... *G06F 11/079* (2013.01); *G06F 11/0709* (2013.01); *H04L 41/069* (2013.01)

(58) Field of Classification Search
USPC ....................................... 714/48, 57
See application file for complete search history.

(56) References Cited

U.S. PATENT DOCUMENTS

| | | | | |
|---|---|---|---|---|
| 2011/0029824 A1* | 2/2011 | Scholer | ............. | G05B 23/0224 714/47.3 |
| 2013/0080978 A1* | 3/2013 | Kakde | ................... | G06Q 10/06 715/854 |
| 2014/0245076 A1* | 8/2014 | Bansal | ................ | G06F 11/3648 714/47.1 |

* cited by examiner

*Primary Examiner* — Sarai Butler
(74) *Attorney, Agent, or Firm* — Tong, Rea, Bentley & Kim, LLC

(57) ABSTRACT

Systems, methods, architectures and/or apparatus providing a visualization tool wherein an initial or simplified correlation tree includes a path between two hierarchically related objects; namely, a root cause object and an object representing an entity associated with an event of interest caused by the root cause entity, wherein the correlation tree may be incrementally increased in size and complexity in response to user input, such as via a graphical user interface, such that the user attention is focused on the specific entities and their relationships to thereby enable a user to quickly understand the various failure relationships.

20 Claims, 11 Drawing Sheets

SYSTEM AND METHOD OF VISUALIZING HISTORICAL EVENT CORRELATIONS IN A DATA CENTER

FIELD OF THE INVENTION

The invention relates to the field of network and data center management and, more particularly but not exclusively, to the management and utilization of event data in networks, data centers and the like.

BACKGROUND

Data Center (DC) architecture generally consists of a large number of compute and storage resources that are interconnected through a scalable Layer-2 or Layer-3 infrastructure. In addition to this networking infrastructure running on hardware devices the DC network includes software networking components (v-switches) running on general purpose compute, and dedicated hardware appliances that supply specific network services such as load balancers, ADCs, firewalls, IPS/IDS systems etc. The DC infrastructure can be owned by an Enterprise or by a service provider (referred as Cloud Service Provider or CSP), and shared by a number of tenants. Compute and storage infrastructure are virtualized in order to allow different tenants to share the same resources. Each tenant can dynamically add/remove resources from the global pool to/from its individual service.

Virtualized services as discussed herein generally describe any type of virtualized compute and/or storage resources capable of being provided to a tenant. Moreover, virtualized services also include access to non-virtual appliances or other devices using virtualized compute/storage resources, data center network infrastructure and so on. The various embodiments are adapted to improve event-related processing within the context of data centers, networks and the like.

Within the context of a typical data center arrangement, a tenant entity such as a bank or other entity has provisioned for it a number of virtual machines (VMs) which are accessed via a Wide Area Network (WAN) using Border Gateway Protocol (BGP). At the same time, thousands of other virtual machines may be provisioned for hundreds or thousands of other tenants. The scale associated data center may be enormous. Thousands of virtual machines may be created and/or destroyed each day per tenant demand.

Each of the virtual ports, virtual machines, virtual switches, virtual switch controllers and other objects or entities within the data center (virtual and otherwise) generates event data in response to many different types of conditions.

All of the events produced by an event-sourcing entity are stored for subsequent use, such as for determining root cause problems associated with events or failures of interest. That is, given an event of interest in the past (e.g., a failure of a virtual entity or object of importance to a customer), the events temporally proximate the failure of interest (e.g., +/− some amount of time) are useful in determining a root cause failure of an event of interest in the past.

However, the various events must be viewed within the context of the real and instantiated structure of the data center at the time of the occurrence of the events. Thus, given that objects/entities within the data structure are constantly changing (instantiated, torn down, migrated, failed, restored etc.), current practice is to store periodic snapshots in time (e.g., every 5 minutes) of the data center structure and use these snapshots to try and identify the root cause failure associated with an event of interest.

Thus, to identify the root cause failure associated with an event of interest the snapshot of the data center structure closest in time to an event of interest is normally used to identify the root cause failure associated with the event of interest. In some systems, the two snapshots of the data center structure temporally bracketing the event of interest may be used to identify the root cause failure associated with the event of interest.

Unfortunately, maintaining snapshots of the data center structure is enormously costly in terms of resources and may also be imprecise given the rapid changes inherent in a data center. For example, snapshots every five minutes might be too infrequent, while snapshots every two minutes might be too costly. Generally speaking, these techniques are expensive and scale poorly.

SUMMARY

Various deficiencies in the prior art are addressed by systems, methods, architectures, mechanisms and/or apparatus providing a visualization tool wherein an initial or simplified correlation tree includes a path between two hierarchically related objects; namely, a root cause object (i.e., an object representing the entity associated with the root cause of the event of interest; and an event of interest object (i.e., an object representing the entity associated with the event of interest). The correlation tree may be increased in size and complexity in response to user input, such as via a graphical user interface. The correlation tree may include multiple branches or paths, where each of the multiple branches or paths may include one or more object representative entities. The various branches or paths, as well as the entity representative objects disposed therein, are arranged in a hierarchical manner such that an operator or user may quickly understand the various failure relationships.

An apparatus according to one embodiment for managing a plurality of entities within a data center or network may comprise a processor and a memory communicatively connected to the processor, the processor configured for: determining, for an event of interest, a corresponding entity of interest; determining, for a root cause of the event of interest, a corresponding root cause entity; performing a visualization function configured to provide image representative data including a root cause object and an entity of interest object arranged within an image region in accordance with a hierarchical order to form thereby a correlation tree; and in response to data indicative of a selection of the entity of interest object, the visualization function being further configured to provide image representative data of at least one object representing an entity impacted by the event of interest, the at least one entity of interest impacted entity object arranged within the image region in accordance with the hierarchical order.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
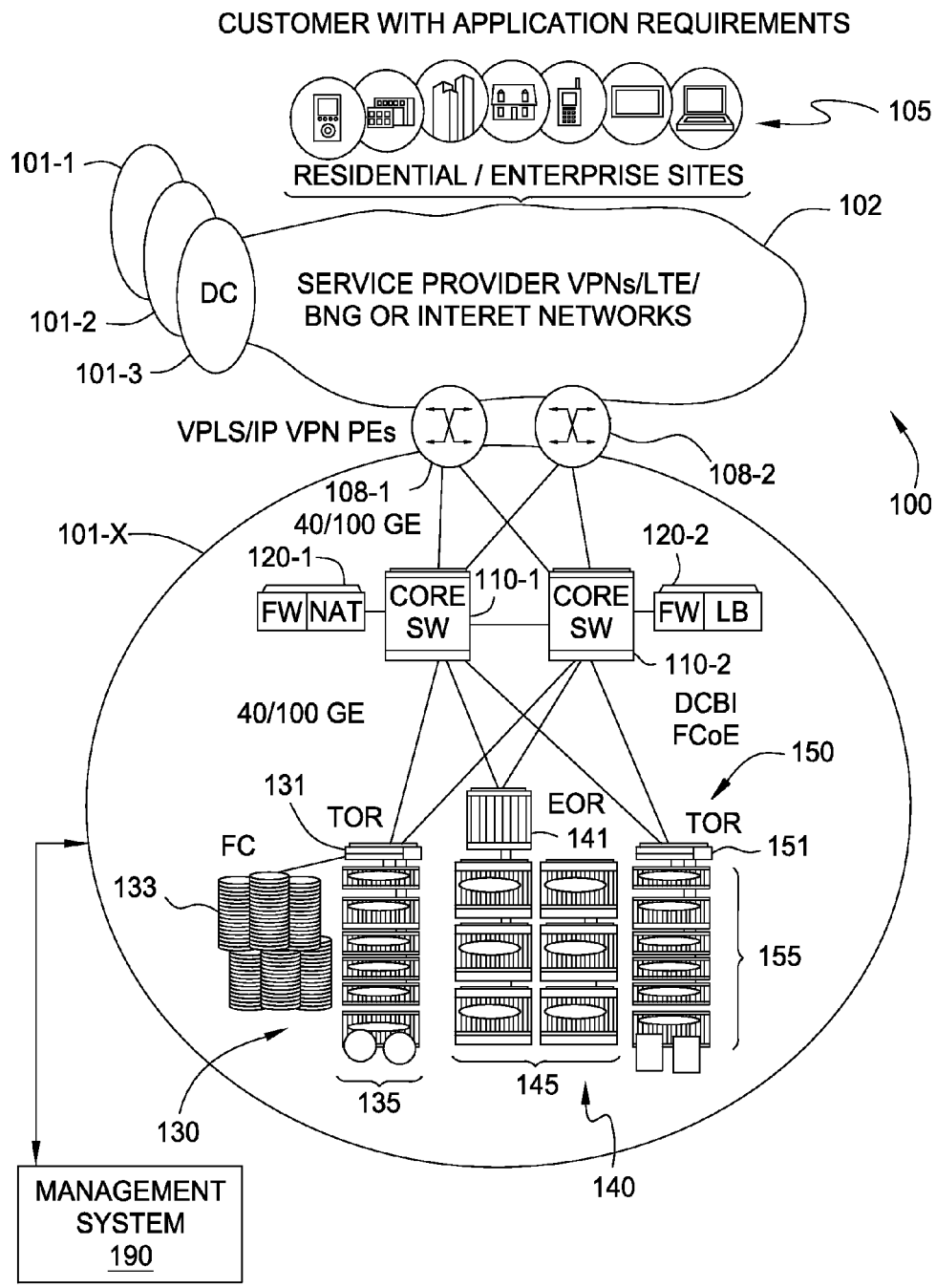
FIG. 1 depicts a high-level block diagram of a system benefiting from various embodiments.

The invention will be discussed within the context of systems, methods, architectures, mechanisms and/or apparatus for identifying historic hierarchical failure relationships of managed objects/entities at a data center to determine root cause failures associated with historic event of interest and/or determine historic or subsequent impact of the historic event of interest another objects/entities at the data center.

For example, given an event of interest in the past (e.g., a failure of a virtual entity or object of importance to a customer), the events temporally proximate the failure of interest (e.g., +/− some amount of time) are useful in determining a root cause of that event of interest.

First, for each temporally proximate event, the corresponding event log data indicative of the virtual object associated with the event, and the date indicative of the parent virtual object of that virtual object, is used to recreate a relation graph (failure graph) representing the virtual objects and protocols in existence at the time of the failure of interest.

Second, the recreated relation graph is used by the rules engine to process the historic event data (or some portion thereof) to identify thereby the root cause of the historic event of interest. That is, the recreated (historic) relation graph is used by the rules engine to process some portion of the stored events from the event logs to recreate the conditions associated with the failure or other event of interest such that the root cause of the failure or other event of interest can be established.

In various embodiments, the re-created relation graph is used by the rules engine to process the historic event data (or some portion thereof) to identify thereby the impact of the historic event of interest. That is, the re-created (historic) relation graph is used by the rules engine to process some portion of the stored events from the event logs to re-create the conditions associated with the failure or other event of interest such that the impact of the failure or other event of interest upon other objects/entities within the DC may be determined.

For example, a failure of a virtual switch supporting (i.e., hierarchically above) a number of virtual machines in a data center will result in the generation of alarms indicative of the failure of the virtual switch, the failure of each of the virtual machines, the failure of the virtual ports supported by the virtual machines and so on. Thus, the root cause of a failure of a virtual machine port may comprise a failure of a virtual machine associated with that report. Similarly, the impact of a failure of a virtual switch may comprise a failure of communication paths associated with a number of virtual machines.

However, it will be appreciated by those skilled in the art that the invention has broader applicability than described herein with respect to the various embodiments.

Virtualized services as discussed herein generally describe any type of virtualized compute and/or storage resources capable of being provided to a tenant. Moreover, virtualized services also include access to non-virtual appliances or other devices using virtualized compute/storage resources, data center network infrastructure and so on. The various embodiments are adapted to improve event-related processing within the context of data centers, networks and the like. The various embodiments advantageously improve such processing even as problems due to the nature of virtual machines, mixed virtual and real provisioning of VMs and the like make such processing more complex. Moreover, as data center sizes scale up the resources necessary to perform such correlation become enormous and the process cannot be handled in an efficient manner.

Various embodiments described herein relate to a visualization tool for generating visualization graphical user interface (GUI) imagery and/or other imagery presented to operators are users managing a network or data center. In particular, within the context of managing a network or data center the operators or users perform various troubleshooting, maintenance and other tasks in response to information pertaining to the various virtual and nonvirtual entities, network elements, communications links and so on forming a network or data center being managed.

An exemplary visualization tool may include a computer program that generates management display visualizations adapted to prioritize operator/user efforts, provide operational and performance information pertaining to virtual and nonvirtual network elements, communications links and other managed entities. The computer program may be executed within the context of a management system (MS) implemented in whole or in part at a network operations center (NOC) or other location.

FIG. 1 depicts a high-level block diagram of a system benefiting from various embodiments. Specifically, FIG. 1 depicts a system 100 comprising a plurality of data centers (DC) 101-1 through 101-X (collectively data centers 101) operative to provide compute and storage resources to numerous customers having application requirements at residential and/or enterprise sites 105 via one or more networks 102.

The customers having application requirements at residential and/or enterprise sites 105 interact with the network 102 via any standard wireless or wireline access networks to enable local client devices (e.g., computers, mobile devices, set-top boxes (STBs), storage area network components, Customer Edge (CE) routers, access points and the like) to access virtualized compute and storage resources at one or more of the data centers 101.

The networks 102 may comprise any of a plurality of available access network and/or core network topologies and protocols, alone or in any combination, such as Virtual Private Networks (VPNs), Long Term Evolution (LTE), Border Network Gateway (BNG), Internet networks and the like.

The various embodiments will generally be described within the context of IP networks enabling communication between provider edge (PE) nodes 108. Each of the PE nodes 108 may support multiple data centers 101. That is, the two PE nodes 108-1 and 108-2 depicted in FIG. 1 as communicating between networks 102 and DC 101-X may also be used to support a plurality of other data centers 101.

The data center 101 (illustratively DC 101-X) is depicted as comprising a plurality of core switches 110, a plurality of service appliances 120, a first resource cluster 130, a second resource cluster 140, and a third resource cluster 150.

Each of, illustratively, two PE nodes 108-1 and 108-2 is connected to each of the, illustratively, two core switches 110-1 and 110-2. More or fewer PE nodes 108 and/or core switches 110 may be used; redundant or backup capability is typically desired. The PE routers 108 interconnect the DC 101 with the networks 102 and, thereby, other DCs 101 and end-users 105. The DC 101 is generally organized in cells, where each cell can support thousands of servers and virtual machines.

Each of the core switches 110-1 and 110-2 is associated with a respective (optional) service appliance 120-1 and 120-2. The service appliances 120 are used to provide higher layer networking functions such as providing firewalls, performing load balancing tasks and so on.

The resource clusters 130-150 are depicted as compute and/or storage resources organized as racks of servers implemented either by multi-server blade chassis or individual servers. Each rack holds a number of servers (depending on the architecture), and each server can support a number of processors. A set of network connections connect the servers with either a Top-of-Rack (ToR) or End-of-Rack (EoR) switch. While only three resource clusters 130-150 are shown herein, hundreds or thousands of resource clusters may be used. Moreover, the configuration of the depicted resource clusters is for illustrative purposes only; many more and varied resource cluster configurations are known to those skilled in the art. In addition, specific (i.e., non-clustered) resources may also be used to provide compute and/or storage resources within the context of DC 101.

Exemplary resource cluster 130 is depicted as including a ToR switch 131 in communication with a mass storage device(s) or storage area network (SAN) 133, as well as a plurality of server blades 135 adapted to support, illustratively, virtual machines (VMs). Exemplary resource cluster 140 is depicted as including an EoR switch 141 in communication with a plurality of discrete servers 145. Exemplary resource cluster 150 is depicted as including a ToR switch 151 in communication with a plurality of virtual switches 155 adapted to support, illustratively, the VM-based appliances.

In various embodiments, the ToR/EoR switches are connected directly to the PE routers 108. In various embodiments, the core or aggregation switches 120 are used to connect the ToR/EoR switches to the PE routers 108. In various embodiments, the core or aggregation switches 120 are used to interconnect the ToR/EoR switches. In various embodiments, direct connections may be made between some or all of the ToR/EoR switches.

A VirtualSwitch Control Module (VCM) running in the ToR switch gathers connectivity, routing, reachability and other control plane information from other routers and network elements inside and outside the DC. The VCM may run also on a VM located in a regular server. The VCM then programs each of the virtual switches with the specific routing information relevant to the virtual machines (VMs) associated with that virtual switch. This programming may be performed by updating L2 and/or L3 forwarding tables or other data structures within the virtual switches. In this manner, traffic received at a virtual switch is propagated from a virtual switch toward an appropriate next hop over a tunnel between the source hypervisor and destination hypervisor using an IP tunnel. The ToR switch performs just tunnel forwarding without being aware of the service addressing.

Generally speaking, the "end-users/customer edge equivalents" for the internal DC network comprise either VM or server blade hosts, service appliances and/or storage areas. Similarly, the data center gateway devices (e.g., PE servers 108) offer connectivity to the outside world; namely, Internet, VPNs (IP VPNs/VPLS/VPWS), other DC locations, Enterprise private network or (residential) subscriber deployments (BNG, Wireless (LTE etc), Cable) and so on.

In addition to the various elements and functions described above, the system 100 of FIG. 1 further includes a Management System (MS) 190. The MS 190 is adapted to support various management functions associated with the data center or, more generically, telecommunication network or computer network resources. The MS 190 is adapted to communicate with various portions of the system 100, such as one or more of the data centers 101. The MS 190 may also be adapted to communicate with other operations support systems (e.g., Element Management Systems (EMSs), Topology Management Systems (TMSs), and the like, as well as various combinations thereof).

The MS 190 may be implemented at a network node, network operations center (NOC) or any other location capable of communication with the relevant portion of the system 100, such as a specific data center 101 and various elements related thereto. The MS 190 may be implemented as a general purpose computing device or specific purpose computing device, such as described below with respect to FIG. 7.

Figure 2:
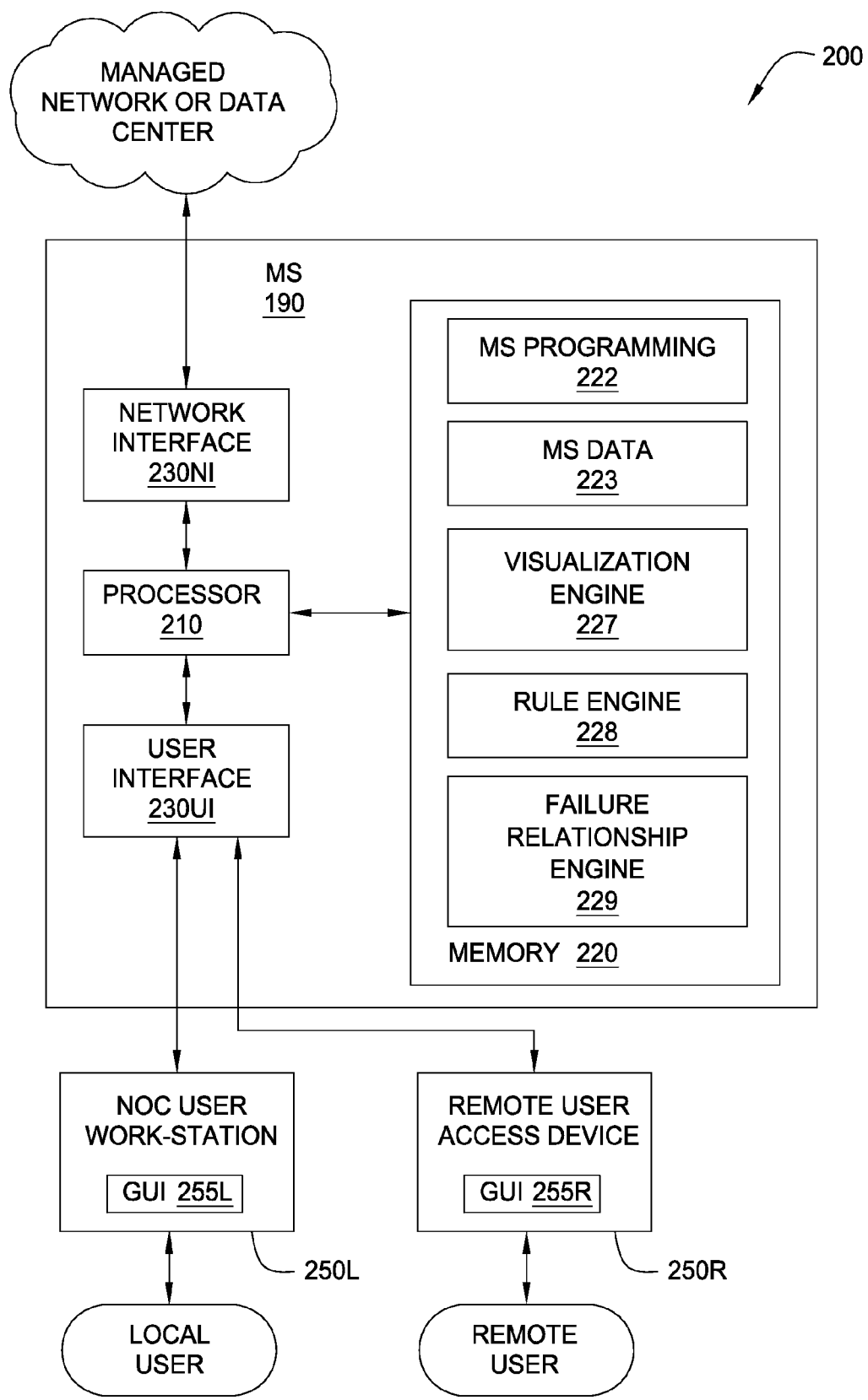
FIG. 2 depicts an exemplary management system suitable for use in the system of FIG. 1.

FIG. 2 depicts an exemplary management system suitable for use as the management system of FIG. 1. As depicted in FIG. 2, MS 190 includes one or more processor(s) 210, a memory 220, a network interface 230NI, and a user interface 230UI. The processor(s) 210 is coupled to each of the memory 220, the network interface 230NI, and the user interface 230UI.

The processor(s) 210 is adapted to cooperate with the memory 220, the network interface 230NI, the user interface 230UI and various support circuits (not shown) to provide various management functions for a data center 101 or the system 100 of FIG. 1.

The memory 220, generally speaking, stores programs, data, tools and the like that are adapted for use in providing various management functions for the data center 101 and/or other networks discussed above with respect to the system 100 of FIG. 1.

The memory 220 includes various management system (MS) programming modules 222 and MS databases 223 adapted to implement network management functionality such as discovering and maintaining network topology, processing VM related requests (e.g., instantiating, destroying, migrating and so on) and the like as appropriate to the group of network elements being managed.

The memory 220 includes a rules engine 228 (e.g., DROOLS) operable to process historic events of virtualized and/or non-virtualized objects, entities, protocols and the like associated with the data center objects or entities within the data center against a data structure representing a hierarchical failure relationship of these objects or entities contemporaneous to the time of the event of interest to identify thereby root cause failures of the event of interest.

The memory 220 also includes a failure relationship engine 229 operable to construct a data structure or otherwise define the hierarchy of failure relationships in a manner suitable for use by the rules engine 228. Generally speaking, the hierarchy of failure relationships identifies hierarchically higher level objects, entities, protocols and the like which, upon failure, necessarily cause the failure of corresponding hierarchically lower level objects, entities, protocols and the like.

The memory 220 also includes a visualization engine 227 operable to process historic or current entity relationship and event information as well as other information to define imagery suitable for use within the context of graphical user interface (GUI) accessed by a network or data center operator or user, such as within the context of a visualization function such as a network element visualization function in which graphic elements or objects corresponding to network elements are generated for use within the context of a graphical user interface or other imagery presented to an operator or user.

For example, various objects intended for display may be defined for an entity of interest or seed entity having associated with it an event of interest such as an alarm or warning, the entity/event that is the root cause of the event of interest, other entities impacted by the entity of interest and so on. Further, the graphic/image properties associated with the objects may be adapted in response to the identification information, alarm information, root cause failure information, impact of failure information and/or other information.

In various embodiments, the MS programming module 222, rules engine 228, failure relationship engine 229 and visualization engine 227 are implemented using software instructions which may be executed by a processor (e.g., processor(s) 210) for performing the various management functions depicted and described herein.

The network interface 230NI is adapted to facilitate communications with various network elements, nodes and other entities within the system 100, data center 101, network 102 or other network element groups to support the management functions performed by MS 190.

The user interface 230UI is adapted to facilitate communications with one or more local user workstations 250L (e.g., local to a Network Operations Center (NOC)) or remote user access devices 250R (e.g., remote user computer or other access device) in communication with the MS 190 and enabling operators or users to perform various management functions associated with a group of network elements being managed via, illustratively, a graphical user interface (GUI) 255.

As described herein, memory 220 includes the MS programming module 222, MS databases 223, rules engine 228, failure relationship engine 229 and visualization engine 227 which cooperate to provide the various functions depicted and described herein. Although primarily depicted and described herein with respect to specific functions being performed by and/or using specific ones of the engines and/or databases of memory 220, it will be appreciated that any of the management functions depicted and described herein may be performed by and/or using any one or more of the engines and/or databases of memory 220.

The MS programming 222 adapts the operation of the MS 190 to manage various network elements, DC elements and the like such as described herein with respect to the various figures, as well as various other network elements (not shown) and/or various communication links therebetween. The MS databases 223 are used to store topology data, network element data, service related data, VM related data, communication protocol related data and/or any other data related to the operation of the Management System 190. The MS program 222 may be implemented within the context of a Service Aware Manager (SAM) or other network manager.

Each virtual and nonvirtual network element generating events communicate these events to the MS 190 or other entity via respective event streams. The MS 190 processes the event streams as described herein and, additionally, maintains an event log associated with each of the individual event stream sources. In various embodiments, combined event logs are maintained. Further, various events may be categorized as critical alarms, major alarms, minor alarms, warnings and so on. Further, various events may be processed to identify specific failed network elements including root cause failed network elements (i.e., failed network elements which are the cause of failure of other network elements). Further, various events may be processed to identify the number of network elements impacted by the failure of a particular network element.

The network interface 230NI is adapted to facilitate communications with various network elements, nodes and other entities within the system 100, DC 101 or other network to support the management functions performed by MS 190.

The user interface 230UI is adapted to facilitate communications with one or more user workstations (illustratively, user workstation 250), for enabling one or more users to perform management functions for the system 100, DC 101 or other network.

As described herein, memory 220 includes the MS programming module 222, MS databases 223, rules engine 228, failure relationship engine 229 and visualization engine 227 which cooperate to provide the various functions depicted and described herein. Although primarily depicted and described herein with respect to specific functions being performed by and/or using specific ones of the engines and/or databases of memory 220, it will be appreciated that any of the management functions depicted and described herein may be performed by and/or using any one or more of the engines and/or databases of memory 220.

The MS programming 222 adapts the operation of the MS 190 to manage various network elements, DC elements and the like such as described above with respect to FIG. 1, as well as various other network elements (not shown) and/or various communication links there between. The MS databases 223 are used to store topology data, network element data, service related data, VM related data, BGP related data, IGP related data and any other data related to the operation of the Management System 190. The MS program 222 may implement various service aware manager (SAM) or network manager functions.

Workstation 250L and remote user access device 250R may comprise computing devices including one or more processors, memory, input/output devices and the like suitable for enabling communication with the MS 190 via user interface 230UI, and for enabling one or more operators or users to perform various management functions associated with a group of network elements being managed via, illustratively, a graphical user interface (GUI) 255.

The GUI 255L of workstation 250L, as well as the GUI 255R of user access device 250R, may be implemented via processor and a memory communicatively connected to the processor, wherein the memory stores software instructions which configure the processor to perform various GUI functions in accordance with the embodiments described herein, such as to present GUI imagery to an operator or user, receive GUI object selection indicative data as well as other input information from an operator or user, and generally support and interaction model wherein the GUI provides a mechanism for user interaction with various elements of the MS 190.

Generally speaking, workstation 250L and remote user access device 250R may be implemented in a manner similar to that described herein with respect to MS 190 (i.e., with processor(s) 210, memory 220, interfaces 230 and so on) and/or as described below with respect to the computing device 700 of FIG. 7. In various embodiments the workstation 250L comprises a dedicated workstation or terminal within a NOC. In various embodiments, the remote user access device 250R comprises a general purpose computing device including a browser, portal or other client-side software environment supporting the various MS 190 communications functions as well as the various GUI functions described herein.

Events and Event Logs

Each virtual and nonvirtual object/entity generating events (i.e., each event source object/entity) communicates these events to the MS 190 or other entity via respective event streams. The MS 190 processes the event streams as described herein and, additionally, maintains an event log associated with each of the individual event stream sources. In various embodiments, combined event logs are maintained.

Each event log generally includes data fields providing, for each event, (1) a timestamp, (2) an event source object/entity identifier (3) any parent object/entity identifiers, (4) an event type indicator and other information as appropriate.

The timestamp is based upon the time the event was generated, the time the event was received and logged, or some other relevant timestamp criteria.

The event source object/entity identifier identifies the object/entity generating the event. The identifier may comprise, illustratively, a Universal Unique Identifier (UUID), an IP address or any other suitable identifier.

The parent object/entity identifiers identify any parent objects/entities associated with the event source object/entity. Specifically, most source objects/entities are associated with one or more parent objects/entities, wherein a failure of a parent object/entity necessarily results in a failure of any child object/entities. Thus, the parent object/entity identifiers identify those objects/entities in a failure relationship with the source object/entity, wherein the parent objects/entities comprise hierarchically higher level entities having failure relationships with the corresponding and hierarchically lower level source (i.e., child) entity.

Event type indicator indicates the type of event generated by the event source object/entity. Various types of events may be generated. For example, nonvirtual object/entity sourced events may comprise events such as UP, DOWN, SUSPEND, OFF-LINE, ON-LINE, FAIL, RESTORE, INITIALIZED and so on; virtual object/entity, virtual machine (VM) and VM-appliance sourced events may comprise events such as UP, DOWN, SUSPEND, STOP, CRASH, DESTROY, CREATE and so on; and IGP/BGP sourced events may comprise events such as New Prefix, Prefix withdrawn, Prefix Unreachable, Prefix Redundancy Changed and so on. Other examples will be known to those skilled in the art.

In various embodiments, each event source object/entity has knowledge of one or more respective parent objects/entities. In these embodiments, the event source object/entity includes parent object/entity identifiers within some or all of the events generated by the source object/entity.

In various embodiments, some or all of the event source objects/entities do not possess knowledge of respective parent objects/entities. However, current parent information for each of the event source objects/entities may be associated with each received event such that the parent information may be included within the event logs. The current parent information may be derived from provisioning information, stored correlation information and/or other management information. This information may be stored in, illustratively, the MS database 223 or other location.

Current Hierarchy of Failure Relationships

In various embodiments, current parent information for event source objects/entities may be retrieved or derived from information within a currently maintained hierarchy of failure relationships of some or all objects/entities within the DC.

The current hierarchy of failure relationships may be organized according to any of a number of data structures or formats, such as discussed in more detail herein. The current hierarchy of failure relationships, however organized, is substantially continually updated in response to changes in the state of the various real and/or virtual objects/entities within the DC, such as due to provisioning changes, object/event failures, object/event capability changes or service degradations and so on to provide thereby a relatively instantaneous or current "snapshot" of parent/child failure relationships of the various object/entities within the DC. Thus, the current hierarchy of failure relationships may be used to identify, for each event source object/entity, any corresponding parent objects/entities contemporaneously associated with an event source object/entity generating an event to be logged. This contemporaneous parent/child information may be included within the event log(s) associated with incoming events.

In various embodiments, the current hierarchy of failure relationships may be formed using a table of associations, using one or more directed trees, using a forest of directed trees forest of directed trees or using some other structure. The current hierarchy of failure relationships may be maintained by the failure relationship engine 229, MS programming 222 or other module within MS 190.

Thus, received events may be logged in a manner including event source object/entity identification along with corresponding parent object/entity information.

Reconstruction of Historic Hierarchy of Failure Relationships

In various embodiments, the rules engine 228 or other module within MS 190 correlates hierarchically related events in accordance with a relational graph or other structure indicative of failure relationships among event sources to identify thereby those failed higher-level objects or entities responsible for (or at least representative of) the various failed lower-level objects or entities. That is, parent/child failure relationship information stored in the various event logs may be used to reconstruct a hierarchy of failure relationships of various objects/entity in existence at some time in the past; namely, a time proximate to or contemporaneous with a historic event of interest. Further, by understanding the parent/child failure relationships of historic object/entities, the root cause and/or impact of the failure of a contemporaneous object/entity may be determined with varying degrees accuracy.

The accuracy of a determination of root cause or impact of a historical failure depends upon a number of candidate or potential root causes or impacts that may exist. If a single root cause of a historic event of interest is found, then it is likely that the single root cause is in fact the cause of that failure. If multiple potential/candidate root causes are found, then further analysis is provided to tiebreaker otherwise resolve one potential/candidate root cause as the most likely root cause of the historic event of interest.

Figure 3:
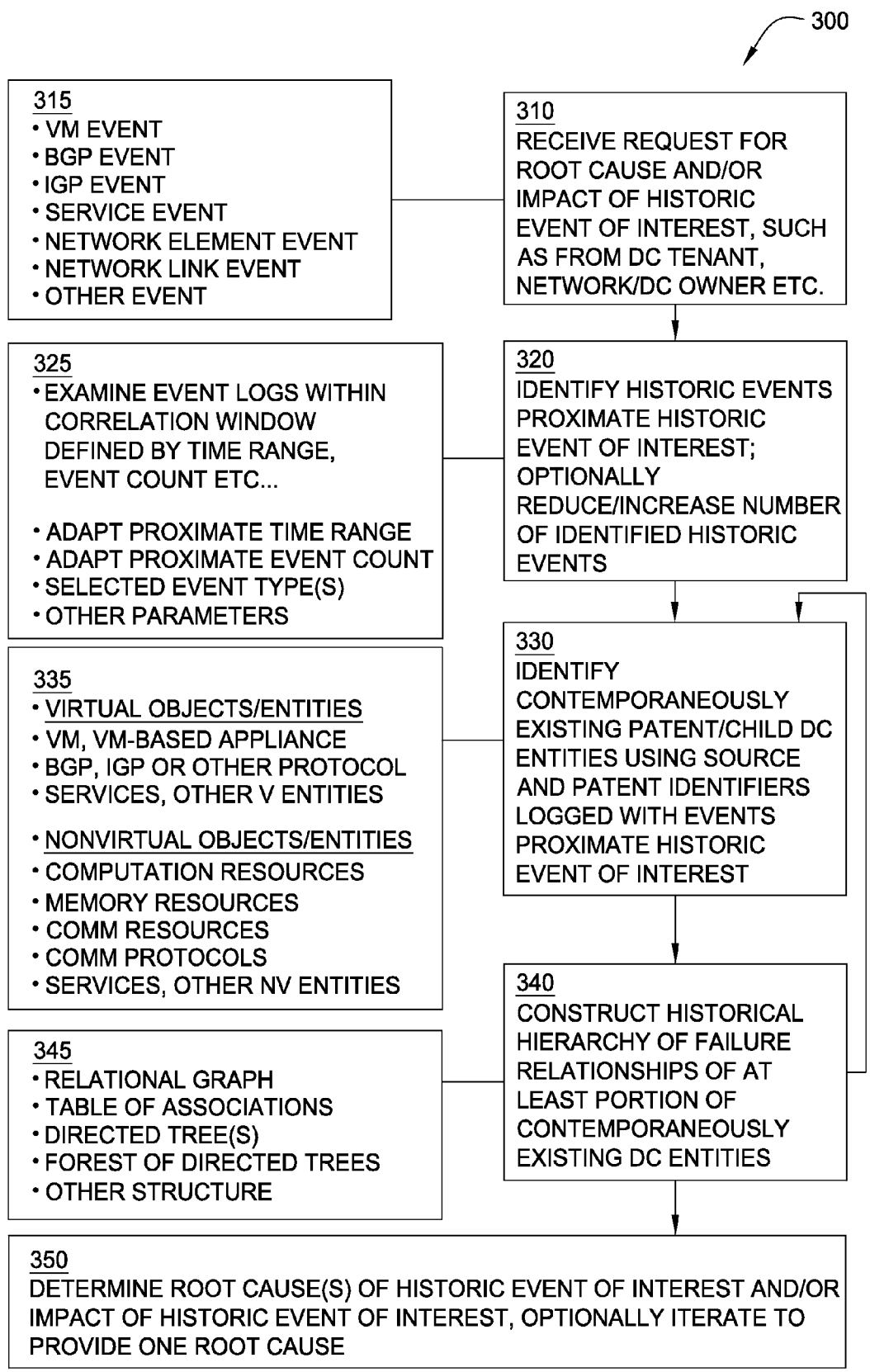
FIG. 3 depicts a flow diagram of methods according to various embodiments.

FIG. 3 depicts a flow diagram of a method according to one embodiment. Specifically, the method 300 of FIG. 3 contemplates various steps performed by, illustratively, the rules engine 228, failure relationship engine 229 and/or other MS programming mechanisms 222 associated with the management system 190. In various embodiments, the rules engine 228, failure relationship engine 229 and/or other MS programming mechanisms 222 are separate entities, partially combined or combined into a single functional module.

At step 310, the method 300 receives a request for a root cause analysis and or impact analysis pertaining to a historic event of interest from a DC tenant, DC owner, network owner, system operator or other entity. In various embodiments, personnel at a Network Operations Center (NOC) may access various program modules to provide historic event root cause analysis, historic event impact analysis and so on, such as within the context of managing a data center or network resources associated with a data center. Referring to box 315, the event correlation request may pertain to a specific VM event, BGP event, IGP event, service event, network element event, network link event or some other event.

At step 320, the method 300 identifies historic events proximate the historic event of interest. While the identified historic events may comprise failure events, warning events, status events and so on, failure events are especially useful in identifying root causes of historic failure events of interest. Referring to box 325, historic events proximate the historic event of interest may be identified by examining event logs within a predetermined or adaptive correlation window (CW) about and including the historic event of interest. The CW may defined by time range, event count or other parameter. Generally speaking, the identified historic events comprise those events generated by virtual and nonvirtual objects/entities existing within the data center proximate the time of the historic event of interest.

Optionally at step 320, the number of identified historic events may be decreased or increased as appropriate. The number of identified historic events may be decreased if sufficient accuracy in determining a root cause of the event of interest is achieved thereby, if specific types of events are more relevant and so on. Similarly, the number of identified historic events may be increased where more events or related information are helpful or necessary in converging upon a single root cause of the historic event of interest. Referring to box 325, the number of identified historic events may be adapted decreased or increased by adapting a proximate time range parameter associated with the CW, by adapting a proximate event count associated with the CW, by selecting one or more event types for inclusion or exclusion from consideration, and/or by modifying other parameters relevant to increasing or decreasing a number of identified historic events proximate the historic event of interest.

At step 330, the method 300 identifies contemporaneously existing parent/child DC object/entities using source identifiers and parent identifiers logged with events proximate the historic event of interest. Specifically, as previously noted, each logged event is associated with an event source object/entity and any parent object/entities corresponding to the source object/entity. Event source object/entity is explicit or implicitly defined by the received event. Parent objects/entities may be explicitly defined by the source object/entity via the generator event or they may be determined with respect to a current may be included within the event generated by the event source object/entity or derived from a currently maintained hierarchy of failure relationships at the time the event is received or logged.

Referring to box 335, virtual objects/entities may comprise virtual objects/entities such as virtual machines (VMs) or VM-based appliances, BGP/IGP or other protocols, user or supervisory services, or other virtual objects/entities. Similarly, nonvirtual objects/entities may comprise computation resources, memory resources, communication resources, communication protocols, user or supervisory services/implementations and other nonvirtual objects/entities.

At step 340, the method 300 constructs a relational graph or other data structure defining a historically relevant hierarchy of failure relationships of the various virtual and nonvirtual objects/entities within the data center identified at step 330; namely, the objects/entities existing at a time proximate the historic event of interest. Event data useful in identifying failure relationships may be found in various event logs such as those associated with the identified historic events of step 320 as well as, optionally, other historic events.

Referring to box 345, the hierarchy of failure relationships may be constructed using a relational graph, a table of association, one or more directed trees, a forest of directed trees, or some other data structure or representation mechanism. For example, a hierarchy of failure relationships may be constructed by plotting or positioning each entity and its corresponding parent entities in a directed tree data structure to build up a directed tree (or forest of directed trees) representing the failure hierarchy at the time of the event of interest.

Each event, temporally proximate or otherwise, has associated with it corresponding event log data indicative of the real or virtual object/entity associated with the event, the date of the event and so on. Further, event information provides data indicative of one or more objects/entities that are "parent" or hierarchically superior to the object/entity associated with the event. This information may be used to create a relation graph (failure graph) representing the virtual objects/entities, protocols and so one in existence at the time of the event or corresponding failure of interest.

Generally speaking, the identify the historic events proximate the historic event of interest (step 320), extract parent/child failure relationship information from the event logs associated with these historic events (step 330), and use the extracted parent/child failure relationship information to construct a historically relevant hierarchy of failure relationships including at least those failure relationships associated with the source object/entity of the historic event of interest at a time contemporaneous to the historic event of interest (step 340).

It will be appreciated that steps 330-340 may be iteratively performed for each identified historic event. That is, for each historic event proximate the historic event of interest identified at step 320, respective parent/child failure relationship information is extracted from the appropriate event log at step 330 and added to a historical hierarchy of failure relationships being constructed at step 340. For example, at step 340 respective parent/child failure relationship information may be used to provide corresponding graph vertices to a unidirected graph, relational graph, table of associations, directed tree and the like being created or recovered to provide thereby a historically/temporarily accurate hierarchy of failure relationships of the DC object/entities existing at the time of the historic event of interest.

Thus, even though over time both the virtual and nonvirtual provisioning of the DC changes, the parent/child failure relationship information within the various event logs is used to recover the historically/temporarily accurate hierarchy of failure relationships of the DC object/entities existing at the time of the historic event of interest. In this manner, the hierarchy of failure relationships current at the time of the historic event of interest is recovered or reconstructed.

At step 350, one or more potential root causes of the historic event of interest is determined and/or the impact of the historic event of interest is determined. That is, at step 350 various rules are applied by, illustratively, the rules engine 228 or other module to make such determinations.

In various embodiments, the root cause of a historic event of interest such as a failure event may comprise a failure of the DC object/entity associated with the historic event of interest or a failure of a corresponding higher-level DC objects/entity within the hierarchy of failure relationships. Similarly, a failure of the DC object/entity associated with the historic event of interest may result in the failure of other DC objects/entities.

As previously noted, accuracy of a determination of root cause or impact of a historical failure depends upon a number of candidate or potential root causes or impacts that may exist. With respect to potential/candidate root causes of a historic event, if a single root cause of a historic event of interest is found, then it is likely that the single root cause is in fact the cause of that failure.

In various embodiments, if multiple potential/candidate root causes are found, then further rules may be applied to break the tie or otherwise resolve one (or at least fewer) potential/candidate root cause as the most likely root cause of the historic event of interest. These rules may utilize additional information such as other provisioning information, other failure information, service provider or user information and the like, which information may be correlated with the event of interest, potential/candidate root causes of the event of interest and so on.

Impact analysis is slightly different than root cause analysis. Root cause analysis is directed to identifying a single root cause associated with an event of interest. However, impact analysis is directed to identifying all of the impacts of that event of interest. In either event, additional rules may be utilized to make such determinations.

In various embodiments, step 350 applies rules that adapt to multiple parent-child failure relationships. For example, such rules may resolve with varying degrees of certainty which of multiple parent object/entity failures resulted in the failure of a corresponding child object/entity having failure relationship with each of the multiple parent objects/entities. Various rules may also be used to address situations where hierarchically nested parent/child failure relationships exist, multiple parent/single child failure relationships exist, single parent/multiple child failure relationships exist, bidirectional failure relationships exist and any combination thereof.

Generally speaking, a hierarchy of failure relationships of objects/entities in existence at a time contemporaneous with the historic event of interest, and associated with failure events proximate the historic event of interest, may be used to determine a one or more root causes or potential root causes of the historic event of interest. That is, for those temporally relevant objects/entities deemed to be failed as indicated by a respective failure event proximate the historic event of interest, the relational graph or other data structure defining the hierarchy of failure relationships is used to correlate failed higher-level objects/entities to corresponding failed lower-level objects/entities, wherein one of the failed lower-level objects/entities comprises the object/entity associated with the historic event of interest.

In various embodiments, the root cause of the historic event of interest is determined by applying various rules to the historic event of interest and hierarchy of failure relationships to identify one or more DC objects/entities which may be the source or root cause of the historic event of interest.

Object/entities or other event sources may provide failure events, warning events, status events and so on. Of particular interest within the context of the various embodiments are failure events. Other embodiments may utilize failure events and warning events.

It will be noted that the various systems, methods, apparatus, mechanisms, techniques and the like described herein with respect to determining a root cause associated with a historic event of interest may be readily adapted to identify, for any event including a historic event of interest, the impact of the event upon other contemporaneously existing and/or subsequent DC objects/entities.

In one embodiment, upon determining the impact of a historic event of interest upon other objects/entities, automatic messages and/or automatic responses may be generated for DC/network service providers, tenants, customers, users and so on associated with an object/entity impacted by the historic event of interest.

Therefore, in various embodiments, appropriate rules/mechanisms by which the rules engine or other processing entity or module may determine which of one of a plurality of potential root causes of a historic event of interest is the particular one root cause of that historic event of interest. An exemplary mechanism will be described below in more detail with respect to FIG. 5. Other mechanisms and variations thereof may be employed within the context of the various embodiments.

Figure 4:
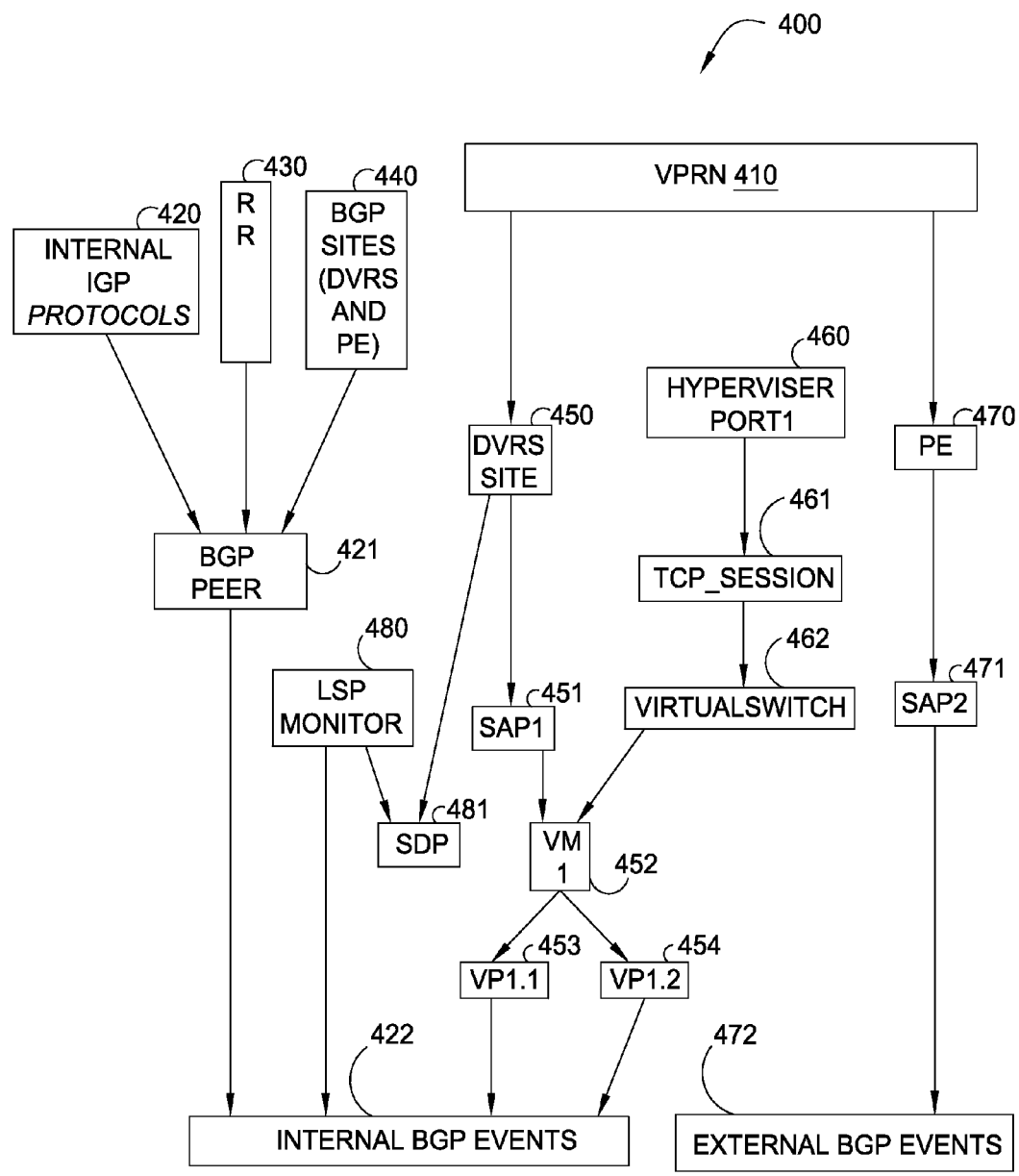
FIG. 4 graphically depicts a hierarchy of failure relationships of DC entities supporting an exemplary virtualized service useful in understanding the embodiments.

FIG. 4 graphically depicts hierarchy of failure relationships of DC entities supporting an exemplary virtualized service useful in understanding the embodiments. Specifically, FIG. 4 depicts virtual and nonvirtual DC objects/entities supporting a Virtual Private Routed Network (VPRN) service as well as the parent/child failure relationships between the various DC objects/entities.

Referring to FIG. 4, it can be seen that a top level VPRN service 410 is a higher-level object with respect to a DVRS site 450 and a provider edge (PE) router 470. PE router 470 is a higher-level object with respect to SAP2 471, which is a higher-level object with respect to external BGP unreachable events 472. DVRS site 450 is a higher-level object with respect to SAP1 451 and SDP 481, which is a higher-level object with respect to internal BGP unreachable events 422. Label Switched Path (LSP) monitor 480 is also a higher-level object with respect to Service Distribution Path (SDP) 481.

SAP1 451 is a higher-level object with respect to a first virtual machine (VM 1) 452, which is a higher-level object with respect to first virtual port (VP1.1) 453 and second virtual port (VP1.2) 454 of the first the end 452. Each of the first 453 and second 454 virtual ports are higher-level objects with respect to internal BGP unreachable events 422.

Internal Gateway Protocols (IGPs) 420, Route Reflectors (RR) 430 and Border Gateway Protocol (BGP) sites (e.g., DVRS and PE) 440 are all higher-level objects with respect to a BGP peer 421, which is a higher-level object with respect to internal BGP unreachable events 422.

A first hypervisor port 460 is a higher-level object with respect to a TCP session 461, which is a higher-level object with respect to a virtual switch 462, which is a higher-level object with respect to first VM 452.

Thus, FIG. 4 depicts the various parent/child failure relationships among a number of DC objects/entities forming an exemplary VPRN service 410. The failure of any object/entity representing a higher-level or parent object/entity in a failure relationship with one or more corresponding lower level or child objects/entities will necessarily result in the failure of the lower-level or child objects/entities. Further, it can be seen that multiple levels or tiers within a hierarchy of failure relationships are provided. Further, it can be seen that an object/entity may have failure relationships with one or more corresponding higher-level or parent objects/entities, one or more lower-level or child object/entities or any combination thereof.

The various embodiments described herein may be advantageously employed within the context of a number of applications such as the following, any of which may be implemented as a revenue generating application of a data center owner or service provider: (1) On-demand historic failure analysis; (2) Analysis of historic data to improve DC performance; (3) Analysis of historic data to improve customer experience or performance; (4) Analysis of historic data to enable customers to more precisely define necessary virtual resources, thereby avoiding waste and improving experience; and/or other applications.

Figure 5:
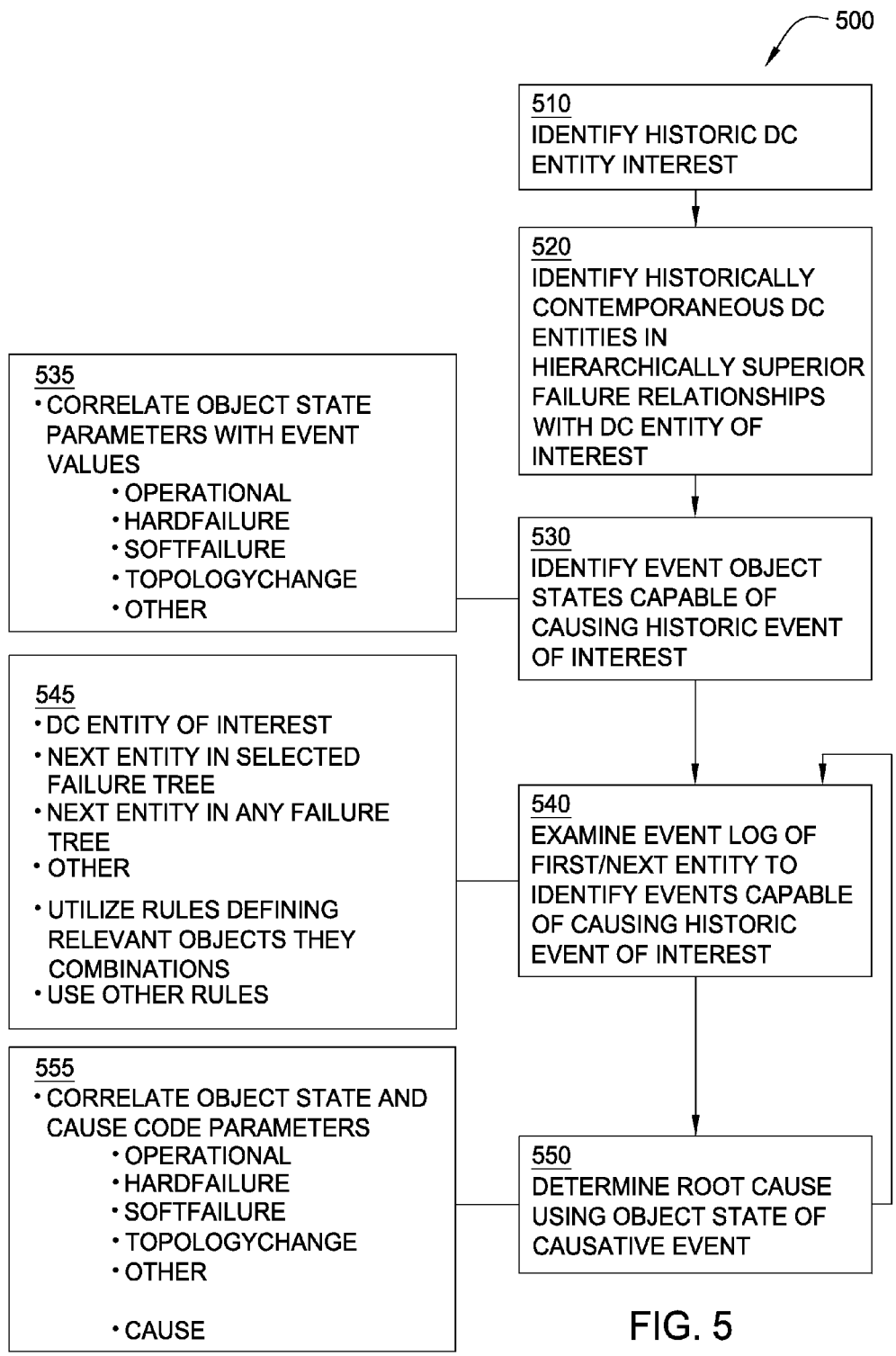
FIG. 5 depicts a flow diagram of a method for determining one or more potential root causes of a historic event of interest.

FIG. 5 depicts a flow diagram of a method 500 for determining one or more potential root causes of a historic event of interest. Various embodiments of the method 500 of FIG. 5 are suitable for use in implementing step 350 as described above with respect to the method 300 of FIG. 3.

At step 510, the method 500 identifies the DC entity of interest. That is, the DC entity provisioned/instantiated at the time of the historic event of interest that, in fact, generated the historic event of interest is identified.

At step 520, the method 500 identifies those DC entities contemporaneous to the DC entity of interest that are in hierarchically superior failure relationships with the DC entity of interest. That is, using a historically relevant hierarchy of failure relationships including the DC entity of interest, those DC entities in a hierarchically superior failure relationship with the DC entity of interest are identified (i.e., those entities which, if failed, would necessarily cause failure of the entity of interest).

At step 530, the method 500 identifies event object states (i.e., event types/parameters) capable of causing historic event of interest. Referring to box 530, in various embodiments each event has associated with it various parameters or logic/object states which may be used to help determine root cause associated with a historic event of interest and, if desired, impact of that historic event of interest. For example, an object state parameter for an event may be defined to include any of the following values: (1) operational; (2) hardFailure (complete out-of-service state); (3) softFailure (partial failure or degradation of functionality); and (4) topologyChange. More, fewer and/or different values may be included within the correlation object state parameter.

At step 540, the method 500 examines the event log associated with a first or next DC entity identify therein any events having the object state capable of causing the historic event of interest. For example, if the event of interest reports object state as hardFailure, then searches for hardFailure and topologyChange object states on higher graph events (i.e., the event associated with hierarchically superior DC entities in failure relationship with DC entity of interest) are appropriate. In various embodiments, other types of events are ignored. It is noted that lower level objects cannot have hardFailure when higher objects are operational.

In various embodiments, rules are provided to define substantially all combinations of lower-level and higher-level object states in the graph. Other rules may be used in addition to or instead of these rules.

At step 550, the method 500 determines a root cause using object state information associated with a causative event identified at step 540. If no causative event was identified at step 540, and the method 500 repeats step 540 and 550.

In particular, at step 550 a correlation is made between an object state and a cause code associated with an event identified at step 540. For example, an object state may indicate that "BGP peer down" wherein a corresponding cause code may indicate that "configuration changed."

Various rules may be applied to correlate numerous potential object state and cause code combinations.

Various rules may be applied to make decisions between multiple potential root cause failures. For example, a native object state (i.e., a state specific for an object) may be used in a tie-breaking procedure to identify a single one of several potential root cause failures as the specific root cause failure associated with the historic event of interest.

Various embodiments address the situation wherein multiple events of different types come from the same object, where the object is a potential for root cause. Each object may be associated with a list of event types, wherein an allocation of priority to each object and/or each event type is used to determine a root cause of the historic event of interest.

Figure 6:
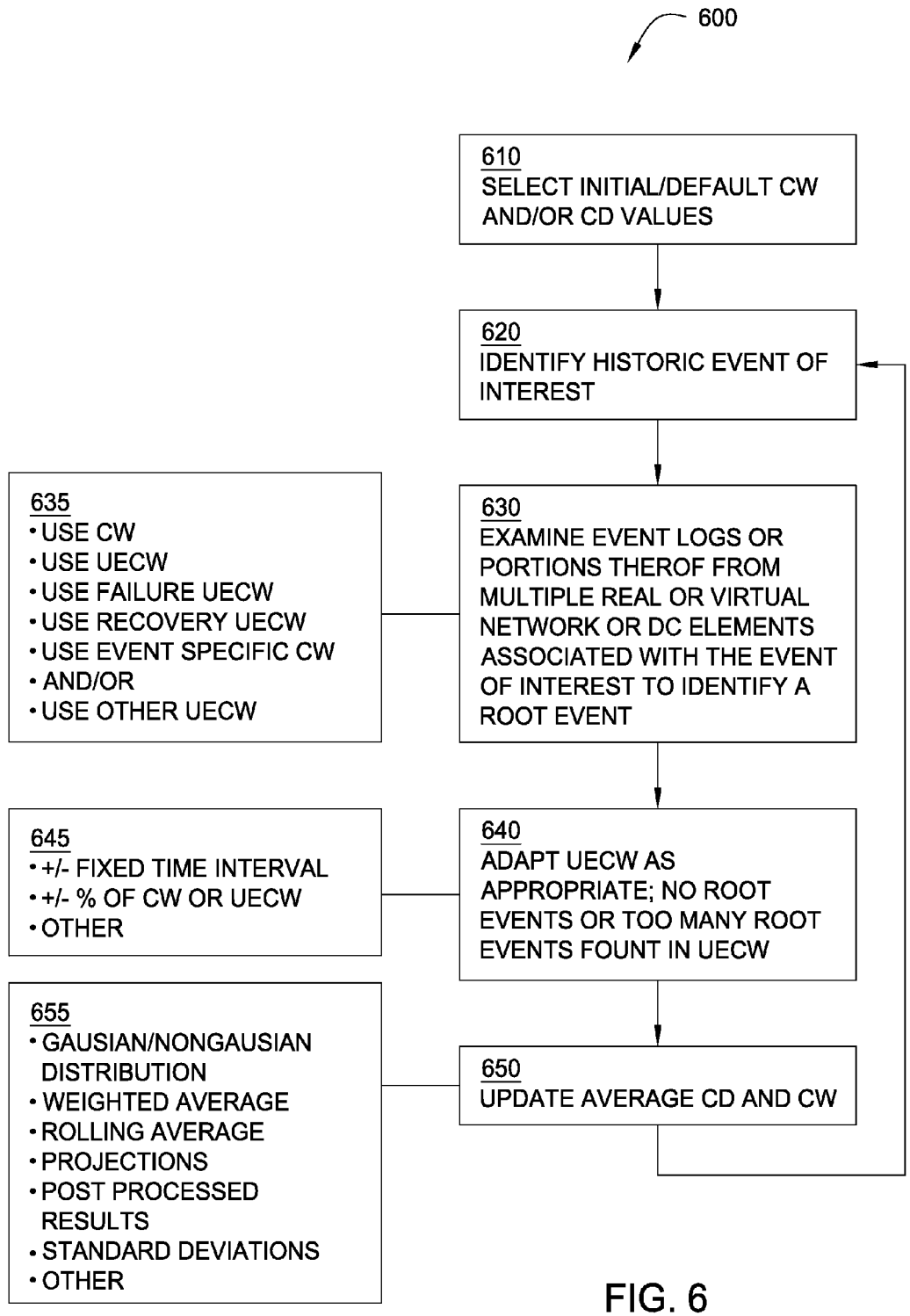
FIG. 6 depicts a flow diagram of a correlation window adaptation method suitable for use in various embodiments.

FIG. 6 depicts a flow diagram of a correlation window adaptation method suitable for use in various embodiments; Various embodiments of the method 600 of FIG. 6 are suitable for use in implementing step 320 as described above with respect to the method 300 of FIG. 3.

Generally speaking, the method 600 of FIG. 6 uses event log information associated with historic events temporally located within a correlation window (CW) proximate the event of interest to identify one or more events correlated with the historic event of interest that may comprise a root cause of the event of interest. Similarly, correlations between the historic event of interest and other events may be used to determine the impact of the event of interest upon other entities within the data center.

The method 600 operates to improve a correlation function by dynamically adjusting a period of time defined herein as a correlation window (CW) within which a correlated event pair including the event of interest exists. If more than one event may be correlated to the event of interest, then the correlation becomes ambiguous. In various embodiments, multiple root cause events may exist. For example, assume that the time around an event of interest comprises, illustratively, 10 seconds prior to and/or after an event of interest. However, the actual time between two correlated events may be much less than 10 seconds, the root cause event logged prior to the event of interest and so on. It should be noted that in this example 10 sec is a default CW, which may be increased or decreased as appropriate given the type of historic event of interest and likely causes of the historic event of interest.

For purposes of this discussion, a Correlation Window (CW) is defined as the time interval relative to a historic event of interest where a correlated root cause event most likely shall be found, while a Correlation Distance (CD) is defined as the time between the two correlated events. Different CW definitions are used within the context of different embodiments, such as by using various statistical techniques.

In some embodiments, the CW is defined as an Average CD±one CD Standard Deviation (or two SDs, or three SDs etc.). The average CD may be defined with respect to all of the events logged, some of the events logged, a predefined number of logged events, the logged events in a predefined period of time and so on. In essence, an average, rolling average or other sample of recent log events is used. The CD Standard Deviation may be calculated using the event log data. The standard deviation may contemplate a Gaussian distribution or any other distribution. Thus, a historic event of interest may be correlated with a later occurring or earlier occurring root cause event.

While generally described within the context of statistical averaging using Gaussian distributions, other statistical mechanisms may be used instead of, in addition to, or in any combination, including weighted average, rolling average, various projections, Gaussian distribution, non-Gaussian distribution, post processed results according to Gaussian or non-Gaussian distributions or standard deviations and so on.

At step 610, the method 600 begins operation by selecting initial/default CW and/or CD values. That is, an initial or default value for use as the correlation window (e.g., ±10 seconds) and/or the correlation distance (e.g., 5 seconds) is selected.

At step 620, the historic event of interest is identified, such as discussed with respect to step 310 and box 315 of the method 300 of FIG. 3.

At step 430, event logs or portions thereof associated with a specific time interval from multiple real or virtual network or DC elements associated with the historic event of interest are examined to identify thereby a potential or candidate root event or events. In the event of a single candidate root event, the historic event of interest is correlated with the single root event to provide thereby an unambiguous event pair. The amount of time between the event of interest and root event is determined as the correlation distance (CD) of the unambiguous event pair.

In various embodiments, multiple root events may be utilized in an average or otherwise statistically significant manner where either of the root events may in fact be a proximate cause of the event of interest. An event of interest may comprise an error or fail condition, or a recovery from an error or fail condition. However, the CD associated with a fault event may be different than the CD associated with a fault recovery event. That is, the time between a root cause event fault and a store the event of interest may be shorter than the time between a root cause event recovery and a corresponding recovery event associated with the stork event of interest. As such, various embodiments utilize an Unambiguous Event Correlation Window (UECW) to define the specific time interval within which to look for a root event.

Referring to box 635, the specific time interval within which a root event is to be identified may comprise the correlation window (CW) as described above, or a specific window selected for root cause identification purposes; namely, the UECW. Moreover, multiple UECWs may be used depending on the type of historic event of interest, such as a failure event UECW, a recovery event UECW, and event specific UECW and/or some other type of UECW.

At step 640, the UECW is adapted as appropriate such as when no corresponding root cause event is discovered or too many potential root cause events are discovered within time interval defined by the UECW. Referring to box 445, the UECW may be increased or decreased by a fixed interval, a percentage of the CW or UECW, or via some other means.

In various embodiments, if the UECW tends to provide ambiguous results (i.e., multiple potential correlated pairs), then the window is slightly decreased, while if the UECW tends to provide no results (i.e., no potential correlated pairs), then the window is slightly increased. This increase may be provided as an amount of time, a percentage of window size and so on. This incremental increase/decrease in UECW is provided automatically by the rules engine 228, MS programming 222 or other entity adapted to identify unambiguous event pairs.

At step 650, the correlation distance CD associated with the unambiguous event pair is used to recalculate/update an Average CD and recalculate the CW window used by the method 600. Referring to box 655, in various embodiments statistical averaging using Gaussian and non-Gaussian distributions, as well as other statistical mechanisms may be used instead of, in addition to, or in any combination with the above-described mechanisms, including weighted average, rolling average, various projections and the like, including post processed results according to Gaussian or non-Gaussian distributions or standard deviations and so on.

In various embodiments a rolling average of CDs is used such as an average of a finite number of previously identified unambiguous event pairs (e.g., 10, 20 100 or more), or a finite time period within which unambiguous event pairs have been identified (e.g., 1 minute, 10 minutes, 30 minutes, one hour and so on).

In various embodiments, a weighted average of CDs is used such as providing a greater weight to more recently identified unambiguous event pairs and/or giving different statistical weight to different types of event pairs based upon type of event of interest (e.g., fault events weighted more or less than recovery events) or other criteria.

The various steps described above with respect to the method 600 of FIG. 6 depicts an exemplary mechanism by which a rules engine 228 and/or MS programming 222 opportunistically adaptive update correlation distance, correlation window and/or other information suitable for use in determining a root cause associated with a store the event of interest.

Figure 7:
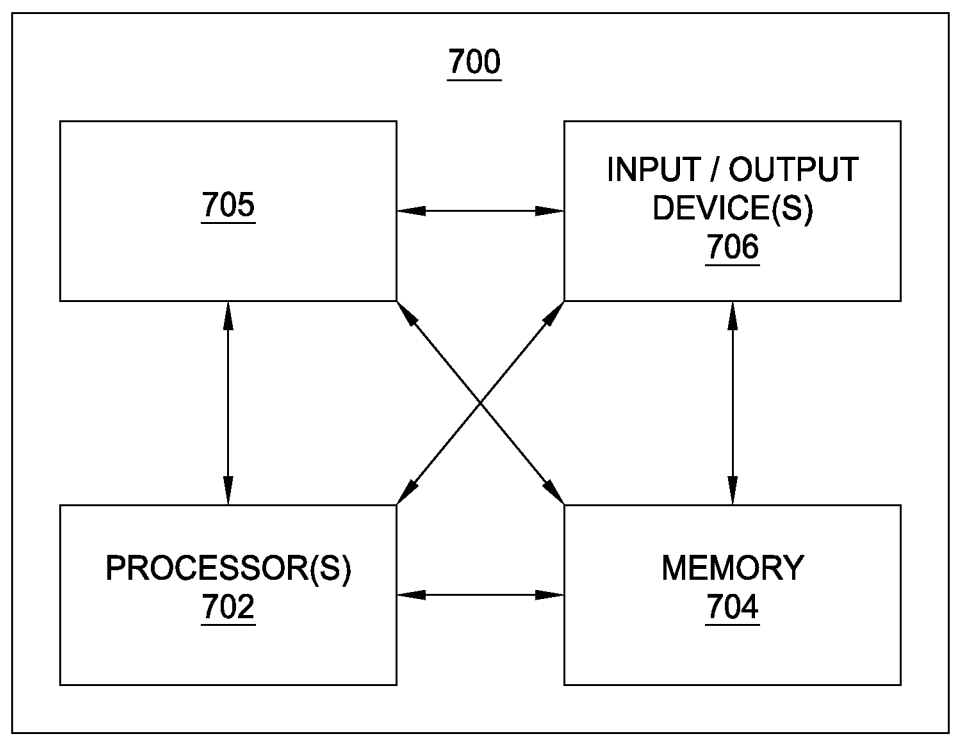
FIG. 7 depicts a high-level block diagram of a computing device suitable for use in performing the functions described herein.

FIG. 7 depicts a high-level block diagram of a computing device such as a used in a telecom or data center network element or management system, suitable for use in performing functions described herein. Specifically, the computing device 700 described herein is well adapted for implementing the various functions described above with respect to the various data center (DC) elements, network elements, nodes, routers, management entities and the like, as well as the methods/mechanisms described with respect to the various figures.

In various embodiments, a business rules management system (BRMS) such as Drools is used to process data center object/entity events or event streams in accordance with historic hierarchy of failure relationships of the event-sourcing objects or entities at the data center to identify thereby historic root cause failures of objects/entities. Specifically, a historic hierarchy of failure relationships identifies, for a particular moment in time, higher-level objects/entities within the data center which, when failed, necessarily produce failure of corresponding lower-level objects/entities. This information is especially useful within the context of identifying root cause failures associated with a historic event of interest, as well as the impact of the historic event of interest upon other objects/entities.

Multiple historic failure relationship hierarchies may be used to identify potential or actual root cause failures (or, conversely, the impact of the event of interest to other objects/entities) associated with failures or service degradations of interest to the system operator, client, user and so on. In various embodiments, the hierarchy of failure relationships is indicated using a relational graph. In various embodiments, the relational graph includes one or more trees.

As depicted in FIG. 7, computing device 700 includes a processor element 702 (e.g., a central processing unit (CPU) and/or other suitable processor(s)), a memory 704 (e.g., random access memory (RAM), read only memory (ROM), and the like), a cooperating module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 705 can be loaded into memory 704 and executed by processor 702 to implement the functions as discussed herein. Thus, cooperating process 705 (including associated data structures) can be stored on a computer readable storage medium, e.g., RAM memory, magnetic or optical drive or diskette, and the like.

It will be appreciated that computing device 700 depicted in FIG. 7 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Visualization of Failure Relationships

The various embodiments discussed above are primarily directed to root cause analysis and impact analysis associated with historical events within the context of a data center. In essence, given a hierarchical structure of virtual and nonvirtual elements within the data center, a determination is made as to the root cause failure associated with an event of interest and the contemporaneous impact of the root cause failure. The root cause analysis and impact analysis discussed with respect to a data center is equally applicable to a communications network or any other system comprising a large number of hierarchically related network elements or other entities.

The amount of information is by operators and users enormous, and the existing tools, techniques, mechanisms and so on are improved in accordance with the various embodiments provided herein. In particular, even though presented with the basic root cause/impact information, network system operators are users are, at times, unable to quickly perform their duties since they may need to manually implement and confirm DC provisioning, protocol usage, customer information and so on associated with a particular event of interest prior to making decisions related to the event of interest.

Various embodiments described herein relate to a visualization tool for generating visualization graphical user interface (GUI) imagery and/or other imagery presented to operators are users managing a network or data center. In particular, within the context of managing a network or data center the operators or users perform various troubleshooting, maintenance and other tasks in response to information pertaining to the various virtual and nonvirtual entities, network elements, communications links and so on forming a network or data center being managed.

An exemplary visualization tool may include a computer program that generates management display visualizations adapted to prioritize operator/user efforts, provide operational and performance information pertaining to virtual and nonvirtual network elements, communications links and other managed entities. The computer program may be executed within the context of a management system (MS) implemented in whole or in part at a network operations center (NOC) or other location.

For example, assuming a hierarchical relationship between a virtual controller, virtual switch, virtual machine, virtual port and BGP protocol, a failure of the virtual controller will necessarily result in a failure of the virtual port (the event of interest). The root cause of the virtual port failure will be identified as the virtual controller. Similarly, the impact analysis of the virtual port failure will identify the virtual switch, virtual machine, virtual port and BGP protocol.

Generally speaking, an exemplary user interface may provide a list view wherein the operator may drill down to select a particular historic event of interest associated with, illustratively, a virtual or nonvirtual entity of a tenant or enterprise. Upon selecting the event of interest, the corresponding entity of interest is determined and a "correlation tree" associated with the entity of interest and root cause entity is displayed. The correlation tree may be easily manipulated to quickly view all of the relevant hierarchically arranged virtual/nonvirtual entities impacted by the event of interest, the root cause event or any other event.

That is, the initial or simplified correlation tree includes a path between two hierarchically related objects; namely, a root cause object (i.e., an object representing the entity associated with the root cause of the event of interest; and an event of interest object (i.e., an object representing the entity associated with the event of interest). The correlation tree may be increased in size and complexity in response to user input, such as indicated by data received in response to user interaction with the GUI. The correlation tree may include multiple branches or paths, where each of the multiple branches or paths may include one or more object representative entities. The various branches or paths, as well as the entity representative objects disposed therein, are arranged in a hierarchical manner such that an operator or user may quickly understand the various failure relationships.

The operator or user may expand the correlation tree via GUI interaction to include additional entities either individually or as objects within a path, additional entities individually or as objects within a path, drill down into specific entities or events to get further information, modify visual parameters of paths and/or entities based upon failure criteria such that a visual indication of failure propagation is provided (e.g., hard failure/soft failure paths as red/yellow; alarm/warning paths as red/yellow and so on) and generally perform various adaptations to increase or decrease the size and information represented within the context of the correlation tree.

Figure 8:
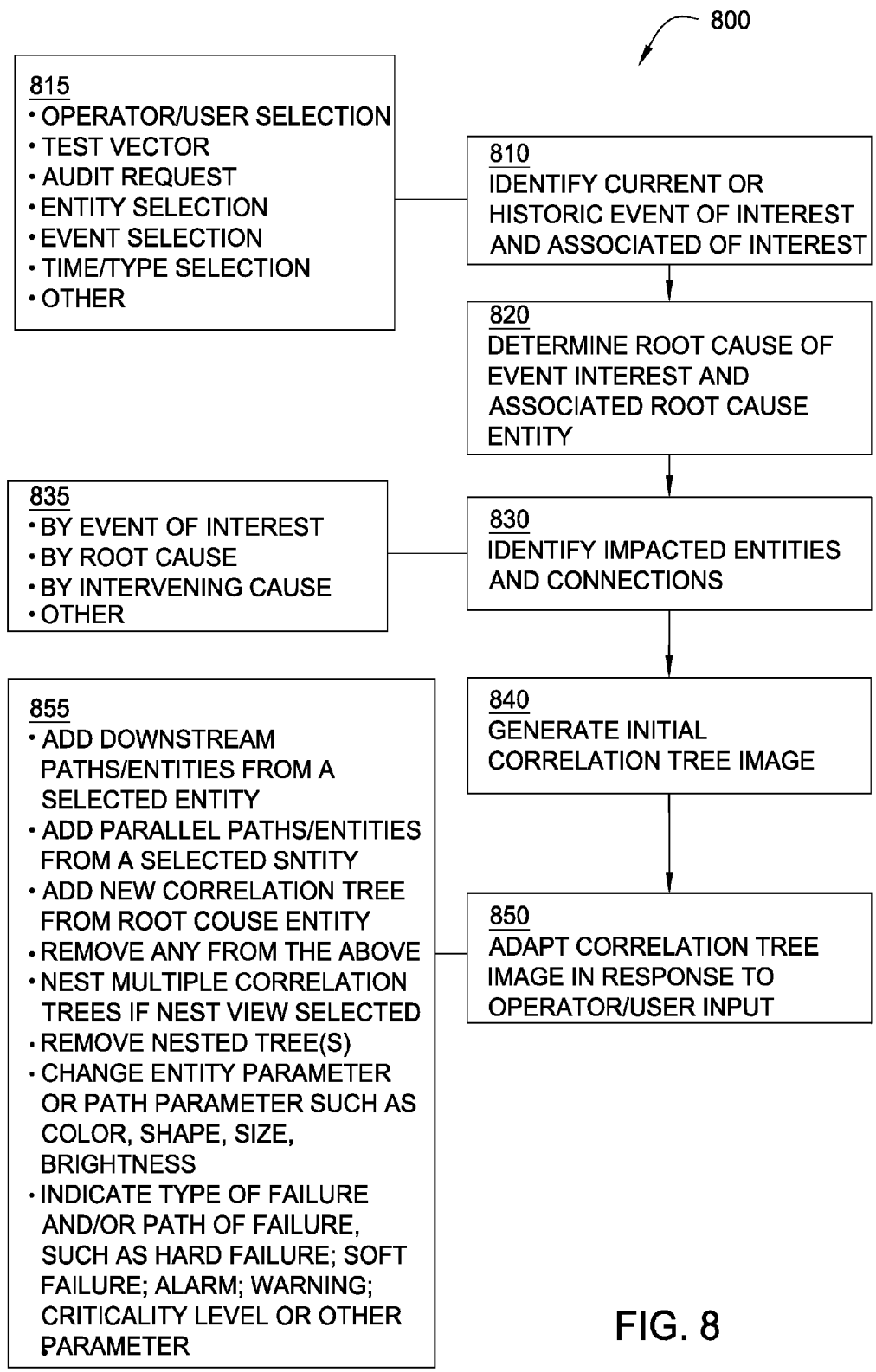
FIG. 8 depicts a flow diagram of a method according to one embodiment.

FIG. 8 depicts a flow diagram of a method according to one embodiment. Specifically, the method 800 of FIG. 8 contemplates various steps performed by, illustratively, the rule engine 228, failure relationship engine 229 and/or other MS programming mechanisms 222 associated with the management system 190. In particular, the method 800 of FIG. 8 contemplates steps performed by a visualization engine 227 associated with the management system 190.

It will be appreciated by those skilled in the art that the various functions described herein may be implemented in whole or in part within the MS 190 itself, a computing device (e.g., a remote operator/user workstation) and/or some other device. In various embodiments, the rule engine 228, failure relationship engine 229, visualization engine 227 and/or other MS programming mechanisms 222 are separate entities, partially combined or combined into a single functional module. In various embodiments, these functions are performed within the context of a general management function, an event/alarm processing function, an alarm generation function or other function.

At step 810, a current or historic event of interest and associated entity of interest are identified or determined. Referring to box 815, this identification or determination may be responsive to operator/user selection of an event or entity of interest, responsive to a received test vector identifying one or more events of interest and/or entities of interest to be investigated, responsive to an audit request such as a request for all events of a particular type, or during a particular time period, or associated with particular entity and so on. Generally speaking, one or more entities may be selected, one or more events may be selected, specific time ranges may be selected, specific types of events may be selected, specific types of entities may be selected and so on.

At step 820, a root cause of the event of interest as well as the entity associated with the root cause are determined. For example, in the case of a virtual switch down event associated with the failed virtual switch, a root cause may be a failure of the virtual switch controller used to control the failed virtual switch.

At step 830, impacted entities and connections are identified. Referring to box 835, the impacted entities and connections may comprise those impacted by the event of interest itself (e.g., entities impacted by failure of the entity of interest), by the root cause of the event of interest (e.g., entities impacted by failure of the root cause entity), by an intervening cause (e.g., entities impacted by failure of an entity between the entity of interest and root cause entity, or downstream from these entities) or other impacted entity and/or connection.

In various embodiments, aspects of steps 810-830 may be performed in the manner described above with respect to various figures, such as in accordance with the operation of the rule engine 228, failure relationship engine 229 as well as various MS programming 222.

At step 840, an initial correlation tree image is generated. For example, in one embodiment upon determining the entity associated with the event of interest (step 810) and the entity associated with the root cause of the event of interest (step 820) an initial correlation tree image graphically depicting these two nodes may be generated. Additional information may also be included within the initial correlation tree image. An exemplary initial correlation tree image is described below with respect to FIG. 9.

At step 850, the correlation tree image is adapted in response to input data indicative of operator or user interaction with correlation tree imagery displayed via a graphical user interface (GUI). Input data may be indicative of selection of a correlation tree object associated with an entity of interest, a root cause entity, an intervening entity, some other entity and/or a communication link, protocol or other connective object there between. It is noted that step 850 may be repeated for as long as an operator or user desires to adapt the correlation tree. Further, a user may interact in a manner to cause display of different images such as the correlation tree view image, list view images depicting events, entities, links there between and the like, as well as other images such as within the context of GUI interaction. Thus, in response to user interaction, the correlation tree image may be adapted in accordance with some or all of the following:

Add or remove downstream paths or entities related to a selected entity, such as a selected entity of interest, root cause entity or some other entity (e.g., selected via user interaction with a GUI or by some other means), such as described below with respect to FIG. 10.

Add or remove parallel paths or entities related to a selected entity to display thereby multiple paths having respective entities associated with a common upstream entity, such as described below with respect to FIG. 10.

Add or remove a new correlation tree related to a root cause entity (i.e., a correlation tree not necessarily including the initial entity of interest).

Nest multiple correlation trees related to a root cause entity to give visual indication of the impact of root cause entity failure upon the system as a whole. Similarly, one or more nested correlation trees may be removed from the correlation tree view.

Change entity parameters such as color, shape, size, brightness and so on in response to various parameters, such as root cause entity identification, entity of interest identification, type of failure, path of failure, path of failure by type, severity of problem, number of downstream impacted entities, duration of problem and so on.

That is, various embodiments contemplate using color coding schemes within the correlation tree to indicate various failure relationships between entities such as soft failures and hard failures. For example, soft failures may comprise warnings such as packet drop rates or buffer utilization or some other parameter exceeding a threshold level, warning indication and so on. In this case, a yellow path including the root cause soft failure entity and subsequent entities and paths exhibiting such warnings may be indicated. Similarly, hard failures may comprise lack of reachability, error or alarm indication and so on. In this case, a red path including the root cause hard failure entity and subsequent entities and paths exhibiting such reachability issues, error or alarm indication and the like may be indicated.

Thus, a visualization function is configured to provide image representative data including a root cause object and an entity of interest object arranged within an image region in accordance with a hierarchical order to form thereby a correlation tree. The failure relationships (cause of failure/impact of failure) among the various entity representative objects may be visually indicated within the correlation tree by adapting color, size, brightness/luminance intensity, shape or other visual parameters as discussed herein. More or fewer failure relationships may be presented to the operator or user by including more or fewer paths or entities within the correlation tree.

The visualization function may be adapted in response to user input adapting tree branch parameters, such as adding or removing (pruning) one or more hierarchically downstream paths and/or entities from a selected entity, adding or removing one or more parallel paths and/or entities from a selected entity, and adding or removing an additional correlation tree from a root cause entity. The visualization function may be adapted in response to user input adapting tree view parameters, such as changing a color of a path or entity, changing a shape of a path or entity, and changing a size of a path or entity. Other visual function adaptations are also contemplated.

Figure 9:
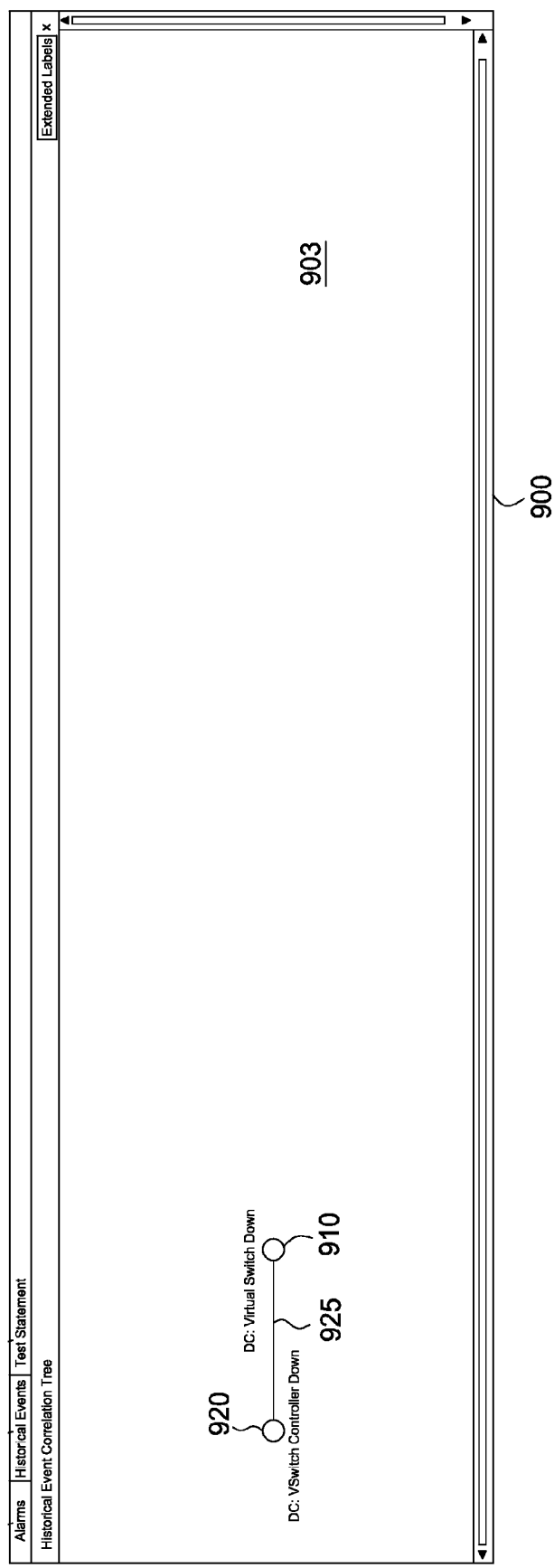
FIGS. 9-11 depict user interface display screens for presenting network element information to operators or users in accordance with various embodiments.
Figure 10:
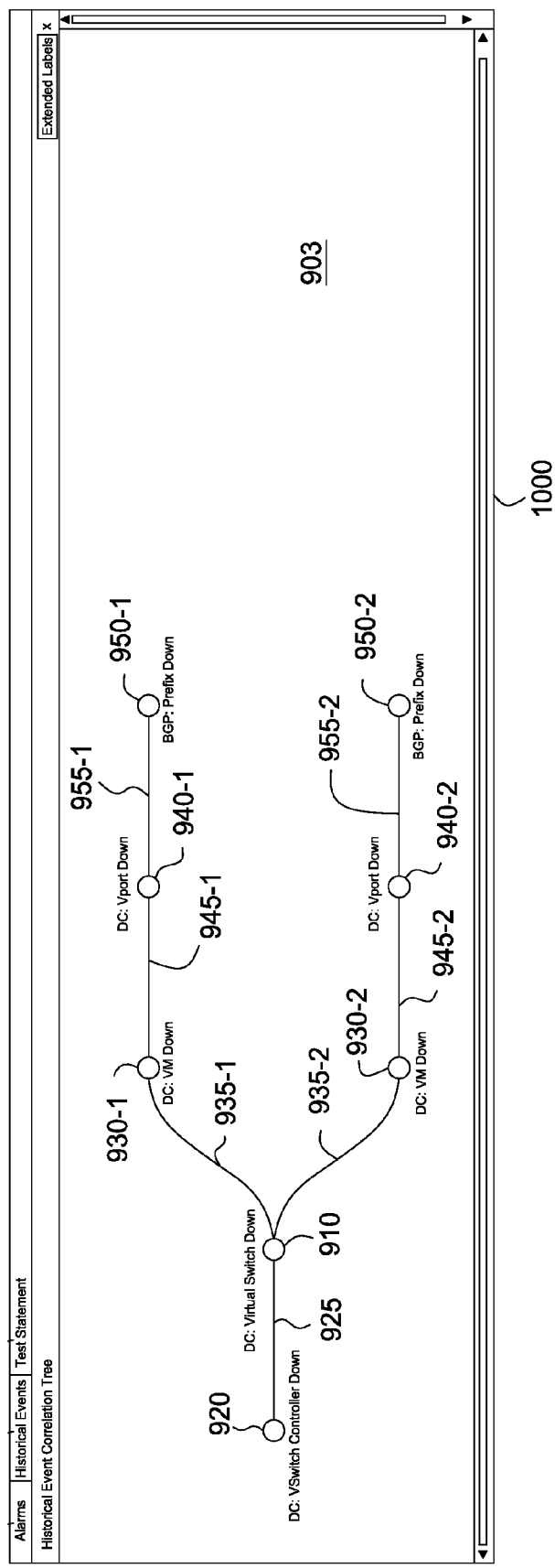
Figure 11:
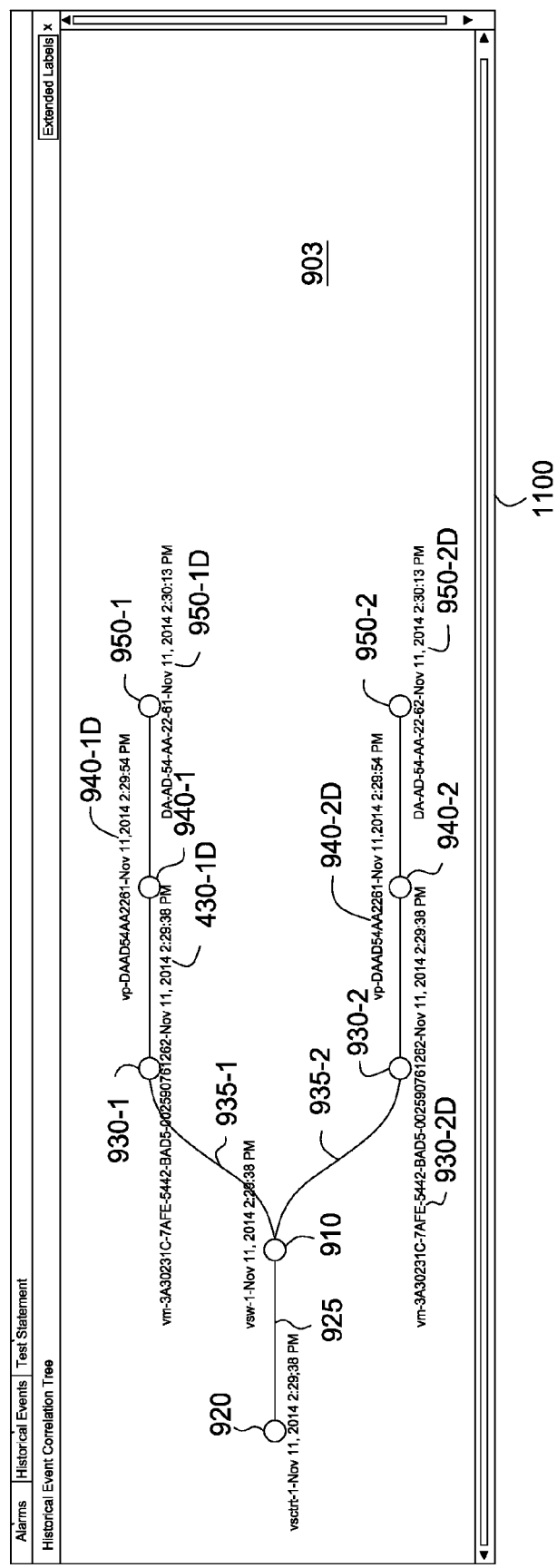

FIGS. 9-11 depict user interface display screens for presenting network element information to operators or users in accordance with various embodiments. Generally speaking, various embodiments provide an operator or user with a starting point for troubleshooting problems in a network or data center by visualizing alarm information in a useful manner.

FIGS. 9-11 depict user interface display screens 900, illustratively within the context of a browser window or tab associated with an address field or similar structure (not shown) and an image region 903. The browser window may comprise any client browser program such as Internet Explorer, Chrome, Opera, Safari, Firefox and so on. Other client-side programs suitable for this purpose are well known to those skilled in the art. Generally speaking, imagery, objects and user functionality provided or displayed within the context of the user interface display 400 is provided to an operator or user via a client computing device executing software associated with the browser program and communicating with a local (e.g., NOC) or remote server or host computing device such as indicated within an address field (not shown).

Referring to FIG. 9, the user interface display 900 includes an image region 903 including an initial correlation tree image. In particular, various graphical objects within a GUI screen are provided to represent an entity of interest 910 (e.g., a virtual switch) in communication with a root cause entity 920 (e.g., a virtual switch controller) via a path 925. The entity of interest 910 is associated with an event of interest (e.g., a "virtual switch down" event). The root cause entity 920 is associated with a root cause event (e.g., a virtual switch controller down" event). In this example, failure of the virtual switch controller 920 is the root cause of failure of entity of interest 910.

The initial correlation tree image in this embodiment comprises only the entity of interest 910 and root cause entity 920. No other intervening or downstream entities are displayed. In various other embodiments, one or more intervening and/or downstream entities may be displayed.

Referring to FIG. 10, the user interface display 900 of FIG. 9 has been adapted by the visualization engine 227 in response to user input (e.g., selection of entity of interest 910 for expansion) to display objects representing two paths or branches of entities downstream from the entity of interest 910. In particular, a first downstream path includes a virtual machine (VM) 930-1, a virtual port 940-1 and a Border Gateway Protocol (BGP) instance 950-1. Similarly, a second downstream path includes a VM 930-2, a virtual port 940-2 and a BGP instance 950-2. Since all of these entities and paths therebetween (logical, virtual and/or nonvirtual) are downstream with respect to failed entity of interest 910, each of entities 930-950 is also depicted as failed. In particular, each VM entity 930 is associated with a respective "VM down" event, each virtual port 940 is associated with a respective "virtual port down" event and each BGP instance 950 is associated with a respective "prefix down" event.

The GUI imagery of FIG. 10 depicts a branch-expanded correlation tree based upon the entity of interest 910. In this manner, and in one visualization, an operator or user may view the entity/event of interest (910/virtual switch down), the root cause entity/event (920/virtual switch controller down), and multiple related impact entities/events (930/VM down; 940/Vport down; 950/BGP prefix down).

As previously discussed, some or all of the entities/events visualized herein may be associated with color-coded paths indicating level of criticality, important or specific customer, application, service and so on.

Referring to FIG. 11, the user interface display 900 of FIG. 9 has been adapted by the visualization engine 227 in response to user input (e.g., selection of "view event information") to display next to each entity object the respective event information associated with that entity object. Embodiment provided herein, the displayed event information includes various event codes, timestamp information and so on. Other types of event information may also be utilized within the context of the embodiments.

Thus, FIG. 9 depicts a view of a correlation tree prior to expansion (i.e., immediately after selection of a seed event or event of interest from a list of events), FIG. 10 depicts a view of the correlation tree after expansion (i.e., after operator selection of the node of interest), and FIG. 11 depicts a view of the correlation tree with extended labels after user selection thereof.

As previously noted, color coding associated with hard failures, soft failures and so on may also be displayed. In the case of multiple soft failures or hard failures, imagery enabling the operator to drill down and otherwise examine such multiple failures may also be determined/displayed.

Generally speaking, the displayed correlation tree represents a moment in time relevant to the seed event (i.e., event of interest) such that the hierarchy of virtual and nonvirtual entities may be very different than what exists at the present time.

Advantageously, the above-described correlation tree provides a visualization by which numerous hierarchically related virtual and nonvirtual entities, as well as soft failures, hard failures and so on may be presented in a useful manner to the operator. Further visualizations may provide alarm/warning sources and/or impacted entities.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. An apparatus for managing a plurality of entities within a data center or network, the apparatus comprising:
    a processor and a memory communicatively connected to the processor, the processor configured for:
    determining, for an event of interest, a corresponding entity of interest;
    determining, for a root cause of the event of interest, a corresponding root cause entity;
    performing a visualization function configured to provide image representative data including a root cause object and an entity of interest object arranged within an image region in accordance with a hierarchical order to form thereby a correlation tree; and
    in response to data indicative of a selection of said entity of interest object, said visualization function being further configured to provide image representative data of at least one first object representing an entity impacted by said event of interest, said at least one first object arranged within said image region in accordance with said hierarchical order.

2. The apparatus of claim 1, wherein said processor is further configured for:
    in response to data indicative of a selection of said root cause entity of interest object, said visualization function being further configured to provide image representative data of at least one second object representing an entity impacted by said root cause entity, said at least one second object arranged within said image region in accordance with said hierarchical order.

3. The apparatus of claim 1, wherein said correlation tree visually depicts a plurality of entity representative objects representing one or more branches of entities impacted by said root cause.

4. The apparatus of claim 1, wherein said processor is further configured for:
    adapting said correlation tree in response to data indicative of a selection of an adaptable correlation tree branch parameter, said adaptable correlation tree branch parameter comprising one or more of the group consisting of: adding or removing one or more hierarchically downstream paths and entities from a selected entity, adding or removing one or more parallel paths and entities from a selected entity, and adding or removing an additional correlation tree from a root cause entity.

5. The apparatus of claim 1, wherein said processor is further configured for:
    adapting said correlation tree in response to data indicative of a selection of an adaptable correlation tree view parameter, said adaptable correlation tree view parameter comprising one or more of the group consisting of: changing a color of a path or entity, changing a shape of a path or entity, and changing a size of a path or entity.

6. The apparatus of claim 5, wherein said color of a path or entity is selected to indicate a type of failure associated with the path or entity.

7. The apparatus of claim 6, wherein a first color is used to indicate a hard failure and a second color is used to indicate a soft failure.

8. The apparatus of claim 6, wherein a first color is used to indicate an alarm condition and a second color is used to indicate a warning condition.

9. The apparatus of claim 1, wherein said processor is further configured for:
    identifying a plurality of events temporally proximate a historic event of interest at a data center (DC), each event having been generated by a respective source DC entity, each respective source DC entity having a failure relationship with at least one other contemporaneously existing DC entity, each of said failure relationships comprising a higher-level DC entity and a lower level DC entity, each lower level DC entity necessarily failing in response to failure of a corresponding higher-level DC entity;
    defining a hierarchy of failure relationships of the source DC entities and other contemporaneously existing DC entities; and
    identifying, using the hierarchy of failure relationships, those DC entities in a failure relationships with the DC entity associated with the historic event of interest.

10. The apparatus of claim 9, wherein said steps of identifying and defining are iteratively performed for each of said plurality of events temporally proximate said historic event of interest.

11. The apparatus of claim 9, wherein said identifying is performed using one or more event logs, where each line event is associated with a timestamp, a source DC entity identifier and at least one parent DC entity identifier.

12. The apparatus of claim 11, wherein said source DC entity identifier identifies a lower level DC entity in a failure relationship with each of at least one higher-level parent DC entities.

13. The apparatus of claim 9, wherein said processor is further configured for:
    selecting, using the hierarchy of failure relationships of the contemporaneously existing DC entities, any higher-level DC entities in a failure relationship with a corresponding lower level entity comprising the DC entity associated with the event of interest;
    wherein a root cause of the historic event of interest comprises an event associated with at least one of the selected contemporaneously existing DC entities.

14. The apparatus of claim 9, wherein said processor is further configured for:
    selecting, using the hierarchy of failure relationships of the contemporaneously existing DC entities, any lower-level DC entities in a failure relationship with a corresponding higher-level entity comprising the DC entity associated with the event of interest; and
    determining an impact to said lower-level DC entities caused by said event of interest.

15. The apparatus of claim 9, wherein at least one rule is applied to the selected contemporaneously existing DC entities to identify thereby the root cause of the historic failure event of interest.

16. The apparatus of claim 15, wherein said at least one rule is used to determine which events associated with the selected contemporaneously existing DC entities are indicative of a condition capable of causing the historic event of interest.

17. The apparatus of claim 15, wherein said at least one rule is used to determine which event associated with the selected contemporaneously existing DC entities are indicative of a root cause of the historic event of interest.

18. The apparatus of claim 13, wherein the root cause of the historic event of interest is determined using events temporally proximate said historic event of interest associated with a selected higher-level DC entity in a failure relationship with a corresponding lower level entity comprising the DC entity associated with the event of interest.

19. A tangible and non-transient computer readable storage medium storing instructions which, when executed by a computer, adapt the operation of the computer to perform a method for managing a plurality of entities within a data center or network, the method comprising:

determining, for an event of interest, a corresponding entity of interest;

determining, for a root cause of the event of interest, a corresponding root cause entity;

performing a visualization function configured to provide image representative data including a root cause object and an entity of interest object arranged within an image region in accordance with a hierarchical order to form thereby a correlation tree; and in response to data indicative of a selection of said entity of interest object, said visualization function being further configured to provide image representative data of at least one first object representing an entity impacted by said event of interest, said at least one first object arranged within said image region in accordance with said hierarchical order.

20. A computer program product wherein computer instructions, when executed by a processor in a network element, adapt the operation of the network element to provide a method for managing a plurality of entities within a data center or network, the method comprising:

determining, for an event of interest, a corresponding entity of interest;

determining, for a root cause of the event of interest, a corresponding root cause entity;

performing a visualization function configured to provide image representative data including a root cause object and an entity of interest object arranged within an image region in accordance with a hierarchical order to form thereby a correlation tree; and in response to data indicative of a selection of said entity of interest object, said visualization function being further configured to provide image representative data of at least one first object representing an entity impacted by said event of interest, said at least one first object arranged within said image region in accordance with said hierarchical order.

* * * * *